United States Patent
Ikeda

(10) Patent No.: US 7,411,707 B2
(45) Date of Patent: Aug. 12, 2008

(54) IMAGE PROCESSING APPARATUS AND METHOD THEREOF

(75) Inventor: Tohru Ikeda, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 1029 days.

(21) Appl. No.: 10/612,919

(22) Filed: Jul. 7, 2003

(65) Prior Publication Data

US 2004/0017595 A1    Jan. 29, 2004

(30) Foreign Application Priority Data

Jul. 8, 2002    (JP)    ............................ 2002/199219

(51) Int. Cl.
  *G03F 3/08*    (2006.01)
  *G06F 15/00*   (2006.01)
  *G06K 9/36*    (2006.01)
(52) U.S. Cl. .................. 358/518; 358/1.9; 382/252
(58) Field of Classification Search .............. 358/1.9, 358/518, 523, 520, 525, 539, 3.23, 3.03; 382/167, 165, 166, 252
See application file for complete search history.

(56) References Cited

U.S. PATENT DOCUMENTS

| | | | | |
|---|---|---|---|---|
| 5,801,855 | A * | 9/1998 | Ohta | 358/518 |
| 6,215,561 | B1 * | 4/2001 | Kakutani | 358/1.9 |
| 6,330,075 | B1 * | 12/2001 | Ishikawa | 358/1.9 |
| 6,373,990 | B1 * | 4/2002 | Ushida et al. | 382/252 |
| 6,415,065 | B1 * | 7/2002 | Miyake | 382/300 |
| 6,543,870 | B1 * | 4/2003 | Kakutani | 347/15 |
| 6,721,063 | B1 * | 4/2004 | Harrington | 358/1.9 |
| 6,814,420 | B2 * | 11/2004 | Fujita et al. | 347/15 |
| 2001/0035966 | A1 * | 11/2001 | Ohta | 358/1.9 |
| 2002/0054354 | A1 * | 5/2002 | Fukao | 358/3.04 |
| 2002/0140652 | A1 * | 10/2002 | Suzuki et al. | 345/87 |
| 2005/0031199 | A1 * | 2/2005 | Ben-Chorin et al. | 382/162 |
| 2006/0187507 | A1 * | 8/2006 | Konno et al. | 358/521 |

FOREIGN PATENT DOCUMENTS

| | | |
|---|---|---|
| JP | 11-55535 | 2/1996 |
| JP | 08-237497 | 9/1996 |
| JP | 2001-171182 | 6/2001 |

* cited by examiner

*Primary Examiner*—Madeleine A Nguyen
(74) *Attorney, Agent, or Firm*—Fitzpatrick, Cella, Harper & Scinto

(57) ABSTRACT

Even when a color difference diffusion (CD) method which allows high-speed color separation is used, it is difficult to attain preferred color reproduction corresponding to various user's requirements using a small-scale circuit. Hence, a color converter color-converts input image data using a 3D table selected from a plurality of 3D tables, and an interpolation process. A quantization processor obtains error-corrected data by adding error data to the color-converted image data. A dot pattern is selected based on the error-corrected data. The selected dot pattern is output to a print section. The error data is obtained by calculating the difference between a predetermined value corresponding to the dot pattern, and the error-corrected data. The error data is diffused to surrounding pixels.

11 Claims, 16 Drawing Sheets

FIG. 4

| ADDRESS | INPUT DATA (REFERENCE) | | | OUTPUT DATA | | |
|---|---|---|---|---|---|---|
| | Rin | Gin | Bin | Ro | Go | Bo |
| 0x0 | 0 | 0 | 0 | x | x | x |
| 0x1 | 0 | 0 | 16 | x | x | x |
| 0x2 | 0 | 0 | 32 | x | x | x |
| ⋮ | ⋮ | ⋮ | ⋮ | ⋮ | ⋮ | ⋮ |
| 0x10 | 0 | 0 | 240 | x | x | x |
| 0x11 | 0 | 0 | 255 | x | x | x |
| 0x12 | 0 | 16 | 0 | x | x | x |
| ⋮ | ⋮ | ⋮ | ⋮ | ⋮ | ⋮ | ⋮ |
| 0x121 | 0 | 255 | 255 | x | x | x |
| ⋮ | ⋮ | ⋮ | ⋮ | ⋮ | ⋮ | ⋮ |
| 0xfff | 255 | 255 | 255 | x | x | x |

FIG. 9

| OUTPUT COLOR TABLE | | | |
|---|---|---|---|
| ILPC' | ILPM' | ILPY' | KCMY |
| 000 | 000 | 000 | 0000 |
| 000 | 000 | 001 | 0000 |
| 000 | 000 | 010 | 0000 |
| 000 | 000 | 011 | 0000 |
| 000 | 000 | 100 | 0001 |
| 000 | 000 | 101 | 0001 |
| ⋮ | ⋮ | ⋮ | ⋮ |
| 011 | 011 | 001 | 0110 |
| 011 | 011 | 010 | 0110 |
| 011 | 011 | 011 | 0110 |
| 111 | 111 | 100 | 0220 |
| 111 | 111 | 101 | 0221 |
| 111 | 111 | 110 | 0222 |
| 111 | 111 | 111 | 1000 |

FIG. 11

| OUTPUT DENSITY TABLE | | | |
|---|---|---|---|
| KCMY | Cp | Mp | Yp |
| 0000 | 3 | 0 | 12 |
| 0000 | 3 | 0 | 12 |
| 0000 | 3 | 0 | 12 |
| 0000 | 3 | 0 | 12 |
| 0001 | 2 | 7 | 220 |
| 0001 | 2 | 7 | 220 |
| ⋮ | ⋮ | ⋮ | ⋮ |
| 0110 | 130 | 150 | 30 |
| 0110 | 130 | 150 | 30 |
| 0110 | 130 | 150 | 30 |
| 0220 | 195 | 220 | 80 |
| 0221 | 220 | 224 | 180 |
| 0222 | 220 | 225 | 221 |
| 1000 | 241 | 255 | 246 |

FIG. 13

| | C | | |
|---|---|---|---|
| | | 0 | 1 | 2 |
| M | 0 | WHITE | LIGHT CYAN | DARK CYAN |
| | 1 | LIGHT MAGENTA | LIGHT BLUE | CYAN-BLUE |
| | 2 | DARK MAGENTA | MAGENTA-BLUE | DARK BLUE |

FIG. 15

|  | Cp | Mp | Yp |
|---|---|---|---|
| WHITE | 3 | 0 | 12 |
| YELLOW1 | 2 | 7 | 220 |
| MAGENTA1 | 50 | 255 | 127 |
| ⋮ | ⋮ | ⋮ | ⋮ |
| RED = YELLOW + MAGENTA | 40 | 165 | 150 |
| ⋮ | ⋮ | ⋮ | ⋮ |
| DARK RED = YELLOW2 + MAGENTA2 | 54 | 231 | 201 |
| DARK CYAN | 255 | 93 | 38 |
| BLUE = CYAN + MAGENTA | 130 | 150 | 30 |
| GREEN = CYAN + YELLOW | 259 | 92 | 154 |
| BLUE = CYAN2 + MAGENTA2 | 253 | 246 | 125 |
| ⋮ | ⋮ | ⋮ | ⋮ |
| GRAY = CYAN2 + MAGENTA2 + YELLOW | 220 | 224 | 180 |
| GRAY = CYAN2 + MAGENTA2 + YELLOW2 | 220 | 225 | 221 |
| BLACK | 241 | 255 | 246 |

FIG. 16

| ILPC | ILPM | ILPY | KCMY | Cp | Mp | Yp |
|------|------|------|------|-----|-----|-----|
| 000 | 000 | 000 | 0000 | 3 | 0 | 12 |
| 000 | 000 | 001 | 0000 | 3 | 0 | 12 |
| 000 | 000 | 010 | 0000 | 3 | 0 | 12 |
| 000 | 000 | 011 | 0000 | 3 | 0 | 12 |
| 000 | 000 | 100 | 0001 | 2 | 7 | 220 |
| 000 | 000 | 101 | 0001 | 2 | 7 | 220 |
| ⋮ | ⋮ | ⋮ | ⋮ | ⋮ | ⋮ | ⋮ |
| 011 | 011 | 001 | 0110 | 130 | 150 | 30 |
| 011 | 011 | 010 | 0110 | 130 | 150 | 30 |
| 011 | 011 | 011 | 0110 | 130 | 150 | 30 |
| 111 | 111 | 100 | 0220 | 195 | 220 | 80 |
| 111 | 111 | 101 | 0221 | 220 | 224 | 180 |
| 111 | 111 | 110 | 0222 | 220 | 225 | 221 |
| 111 | 111 | 111 | 1000 | 241 | 255 | 246 |

IMAGE PROCESSING APPARATUS AND METHOD THEREOF

BACKGROUND OF THE INVENTION

1. Field of the Invention

The present invention relates to an image processing apparatus and method thereof and, more particularly, to an image process that realizes preferred color reproduction at high speed.

2. Background of the Invention

An image processing apparatus which makes color correction often uses 3×3 matrix operations and gamma conversion so as to attain a high-speed color process and a reduction of the circuit scale. Such matrix operations and gamma conversion can achieve arithmetically faithful color conversion, but cannot achieve preferred color reproduction in correspondence with one's memory colors and favor.

In order to convert color-corrected data into a CMYK signal depending on an output device, the color corrected data undergoes luminance-density conversion, and then undergoes a masking process, under color removal process, and black correction process. These processes impose heavy loads, and it is difficult to attain a size reduction of that circuit.

As a method that can compensate for the above drawbacks, a color difference diffusion (CD) method disclosed in Japanese Patent Laid-Open No. 11-55535 is known. With this method, the distances on a color space are calculated for respective combinations of colors that an output device can reproduce, so as to associate colors closest to those of input image data with each other, and a combination of colors that can minimize the distances is selected. Furthermore, this method is a technique which can implement an arrangement for diffusing the differences among associated colors to other pixels by a small-scale circuit, and can improve a high-speed process and color reproducibility.

However, even when the CD method which allows high-speed color separation is used, it is difficult to attain preferred color reproduction corresponding to various user's requirements using a small-scale circuit.

SUMMARY OF THE INVENTION

The present invention has been made to solve the aforementioned problems individually or together, and has as its object to improve color reproducibility.

In order to achieve the above object, a preferred embodiment of the present invention discloses an image processing apparatus, comprising: a converter, arranged to color-convert input image data using a three-dimensional table selected from a plurality of three-dimensional tables and an interpolation process; a first calculator, arranged to obtain error-corrected data by adding error data to the color-converted image data; an output section, arranged to select a dot pattern from a combination of dot patterns selected from a plurality of combinations of dot patterns on the basis of the error-corrected data, and output the selected dot pattern; and a second calculator, arranged to obtain error data by calculating a difference between a predetermined value corresponding to the output dot pattern, and the error-corrected data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows an example of a three-dimensional lookup table (3D-LUT) shown in FIG. 3;

FIG. 9 shows an example of an output color table;

FIG. 11 shows an example of an output density table;

FIGS. 13 and 14 are views for explaining determination of an output color table; and FIGS. 15 and 16 show examples of tables.

DETAILED DESCRIPTION OF THE PREFERRED EMBODIMENTS

An image processing apparatus according to an embodiment of the present invention will be described in detail hereinafter with reference to the accompanying drawings.

[Arrangement]

Figure 1:
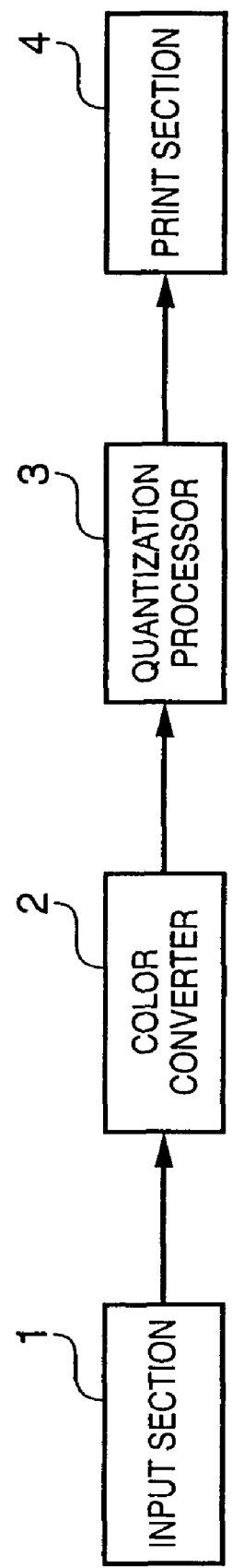
FIG. 1 is a block diagram showing the arrangement of an image processing apparatus according to an embodiment of the present invention.

FIG. 1 is a block diagram showing the arrangement of an image processing apparatus of this embodiment.

Referring to FIG. 1, an input section 1 inputs multi-valued luminance color data. Note that the input section 1 may incorporate a circuit for correcting colors and tone characteristics depending on an input system. The input section 1 is not limited to a reading device such as a scanner or the like, and may input RGB luminance data obtained by converting a color image which is received by a facsimile apparatus having an interface with a medium (a memory card or the like) that stores images, communication unit, and MODEM unit via a known facsimile communication.

A color converter 2 comprises a table memory, interpolation arithmetic processing circuit, and the like, which are represented by techniques disclosed in, e.g., Japanese Patent Laid-Open No. 8-237497 and the like. The detailed arrangement of the color converter 2 will be described later.

A quantization processor 3 comprises a circuit for executing various image processes such as a variable magnification process, gamma correction, noise filtering, edge emphasis, and the like, a quantization circuit, and the like. The arrangement of the quantization circuit will be described later. The quantization processor 3 uses the aforementioned CD method.

A print section 4 comprises a printer represented by an ink-jet printer or laser beam printer, and prints a dot pattern output from a memory using four colors, i.e., C, M, Y, and K.

Figure 2:
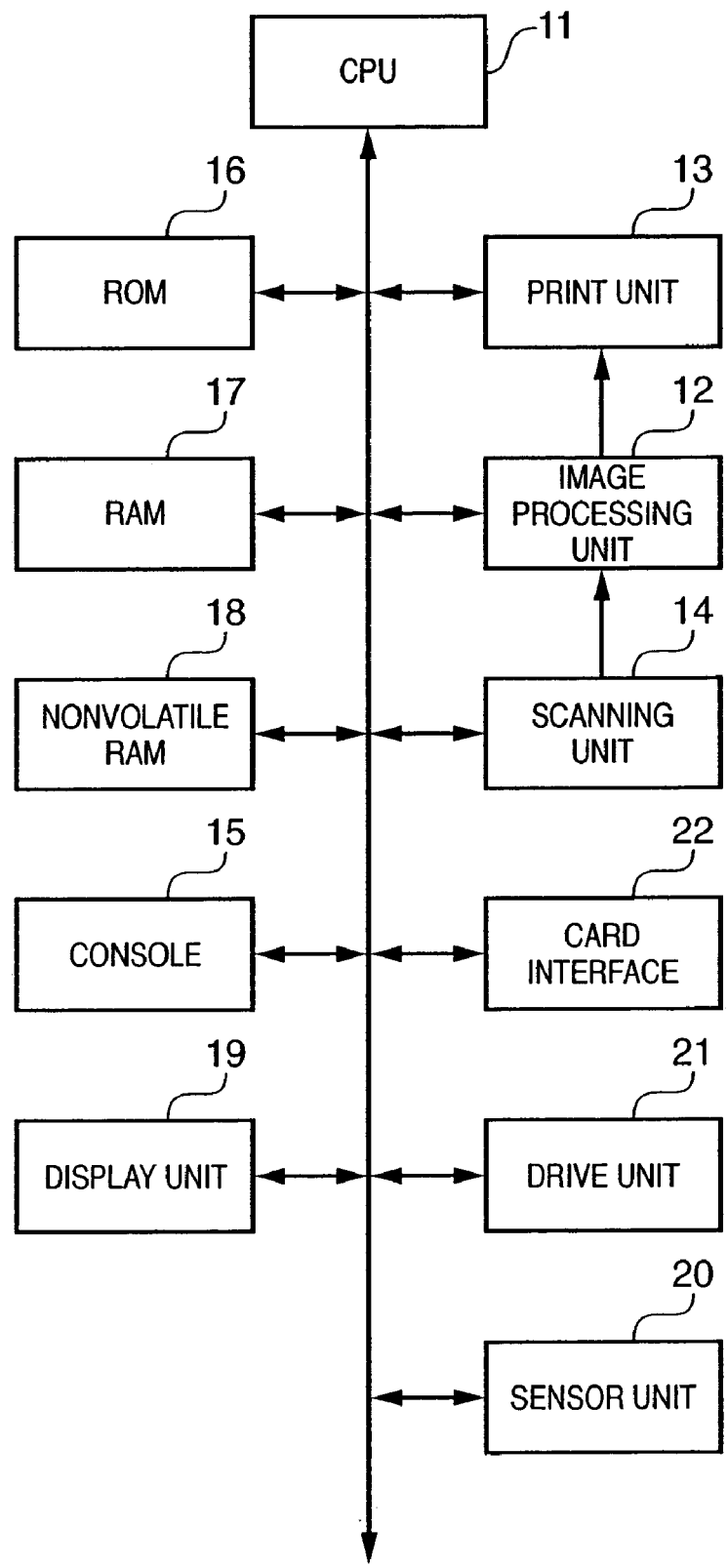
FIG. 2 is a block diagram showing the detailed arrangement of the image processing apparatus shown in FIG. 1.

FIG. 2 is a block diagram showing the detailed arrangement of the image processing apparatus shown in FIG. 1.

Referring to FIG. 2, a CPU 11 controls various functions of the image processing apparatus, and executes an image processing program stored in a ROM 16 in accordance with predetermined operations at a console 15.

A scanning unit 14 which comprises a charge coupled device (CCD) corresponds to the input section 1 shown in FIG. 1. That is, the scanning unit 14 reads a document image and outputs red (R), green (G), and blue (B) analog luminance data. Note that the scanning unit 14 may comprise a contact image sensor (CS) in place of the CCD.

Also, a card interface 22 corresponds to the input section 1 shown in FIG. 1, and reads image data, which is sensed by, e.g., a digital still camera (DSC) and is recorded on a memory card or the like, in accordance with a predetermined operation at the console 15. Note that the color space of the image data read via the card interface is converted from that (e.g., YCbCr) of the DSC into a standard RGB color space (e.g., NTSC-RGB or sRGB) by an image processing unit 12, if required. The read image data undergoes various processes such as resolution conversion into an effective number of pixels and the like required for an application on the basis of its header information, as needed.

The image processing unit 12 corresponds to the color converter 2, quantization processor 3, and the like shown in FIG. 1. The image processing unit 12 executes an image process to be described later, and quantized color data obtained by that image process is stored in a RAM 17. When the quantized color data stored in the RAM 17 reaches a predetermined size required for a print-process of a print unit 13 corresponding to the print section 4 in FIG. 1, the print unit 13 prints an image corresponding to the quantized color data on a recording medium.

A nonvolatile RAM 18 comprises, e.g., an SRAM or the like which is backed up by a battery, and stores data unique to the image processing apparatus and the like. The console 15 comprises a photo direct print start key used to select image data stored in a storage medium and to start a print process, a copy start key in a monochrome or color copy mode, mode keys used to designate modes such as a copy resolution, image quality, and the like, a stop key used to stop a copy operation and the like, a ten-key pad used to input a copy count, a register key, and the like. The CPU 11 detects the depression states of these keys, and controls the respective units in accordance with the detected states.

A display unit 19 comprises a dot-matrix type liquid crystal display (LCD) and an LCD driver, and makes various displays under the control of the CPU 11. Also, the display unit 19 displays thumbnails of image data recorded in a storage medium. The print unit 13 comprises an ink-jet head of an ink-jet system, a versatile IC, and the like. The print unit 13 reads out print data stored in the RAM 17 and prints it out as a hard copy.

A drive unit 21 comprises stepping motors for driving paper feed and discharge rollers in operations of the aforementioned scanning unit 14 and print unit 13, gears for transmitting the driving forces of the stepping motors, driver circuits for controlling the stepping motors, and the like.

A sensor unit 20 comprises a print sheet width sensor, print sheet sensor, document width sensor, document sensor, print medium sensor, and the like. The CPU 11 detects the states of a document and print sheet on the basis of information obtained from these sensors.

[Color Converter]

Figure 3:
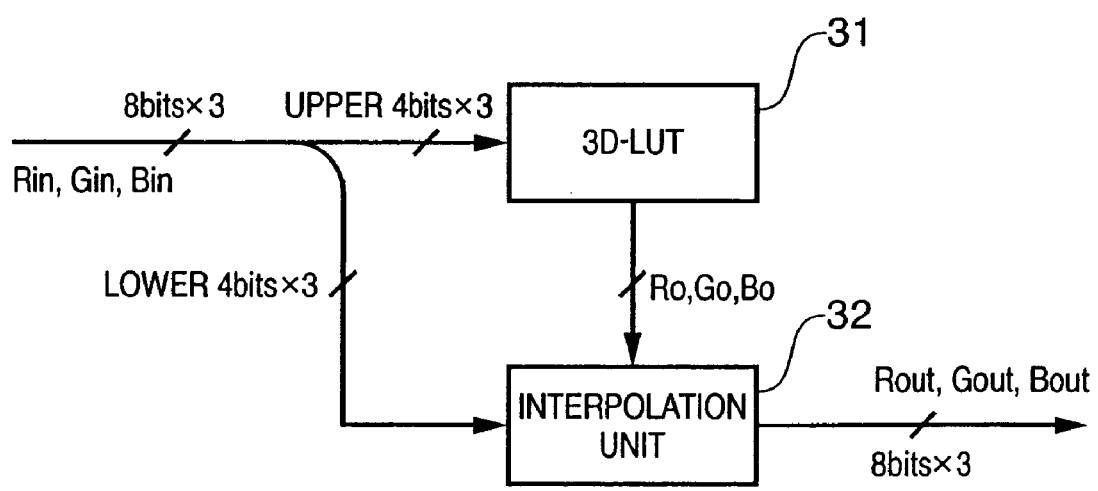
FIG. 3 is a block diagram showing the detailed arrangement of a color converter shown in FIG. 1.

FIG. 3 is a block diagram showing the arrangement of the color converter 2.

A three-dimensional lookup table (3D-LUT) 31 outputs data corresponding to the upper 4 bits (total of 12 bits) of each of input luminance data Rin, Gin, and Bin. An interpolation unit 32 makes an interpolation operation by receiving data Ro, Go, and Bo output from the 3D-LUT 31, and the lower 4 bits (total of 12 bits) of each of input luminance data Rin, Gin, and Bin, and outputs output luminance data Rout, Gout, and Bout (8 bits each). With this interpolation operation, the table size of the 3D-LUT 31 can be reduced. Note that the number of grid points of the 3D-LUT 31 is determined on the basis of the balance between the quality of an image to be processed and the characteristics on the output side, and the table size.

FIG. 4 shows an example of the 3D-LUT 31. A case will be exemplified below wherein the number of grid points is 17, and the spacing between neighboring grid points is 16.

A table shown in FIG. 4 is generated to represent combinations between Rin, Gin, and Bin, and Ro, Go, and Bo using input addresses, which are obtained by extracting the upper 4 bits of input luminance data Rin, Gin, and Bin, and combining the extracted bits. In this case, this table records 4,095 combinations.

If input luminance data Rin, Gin, and Bin correspond to a grid point, output data Ro, Go, and Bo can be directly obtained from the table. However, it is not practical to prepare for a table that describes input/output relationships for all inputs, e.g., $256^3=16,770,000$ colors (each of R, G, and B data=8 bits). Hence, output data other than the grid points (representative points) of the table are calculated by the following interpolation process by the interpolation unit 32.

When input luminance data are applied to a space (hexahedron) divided by 17×17×17 grids, a relationship between the point (input luminance data) included in the hexahedron and surrounding eight grid points is determined. Output luminance data Rout, Gout, and Bout can be calculated from output data Roi, Goi, and Boi (i=1 to 7) corresponding to these eight grid points. However, when the point (input luminance data) included in the hexahedron is defined by the eight grid points, complicated calculations are required. Hence, the space (hexahedron) is further segmented using tetrahedrons each of which couples four grid points.

The segmentation method is implemented as follows by calculating the differences from a reference point. In this embodiment, an explanation will be given using a two-dimensional (2D) space shown in FIG. 5 for the sake of simplicity. Let (x, y)=16, 16) be the reference point of grids, and (xin, Yin)=(28, 20) be the input.

Differences $\Delta x = xin - x$ and $\Delta y = yin - y$ of the input from the reference point are compared. If $\Delta x > \Delta y$, it is determined that the input belongs to region A shown in FIG. 5. Likewise, in the 3D space, the differences of the input from the reference point can be calculated and one of six tetrahedrons to which the input belongs can be determined. After a tetrahedron to which the input belongs is determined, output data Ro, Go, and Bo corresponding to the input can be calculated from output data Ro, Go, and Bo of four grid points corresponding to that tetrahedron by linear interpolation.

Note that conversion from one luminance space into another luminance space has been explained. If density data (or data of another color space) must be input to the next quantization processor 3, luminance-density conversion or conversion into another color space can be combined with the aforementioned conversion. In this case, if more grid points are used, errors due to nonlinear conversion can be reduced, and the conversion precision can be improved. The grid spacing may be constant. However, nonuniform grid spacings may be adopted to obtain a denser grid spacing in a region that requires conversion with higher precision.

[Quantization Processor]

Figure 6:
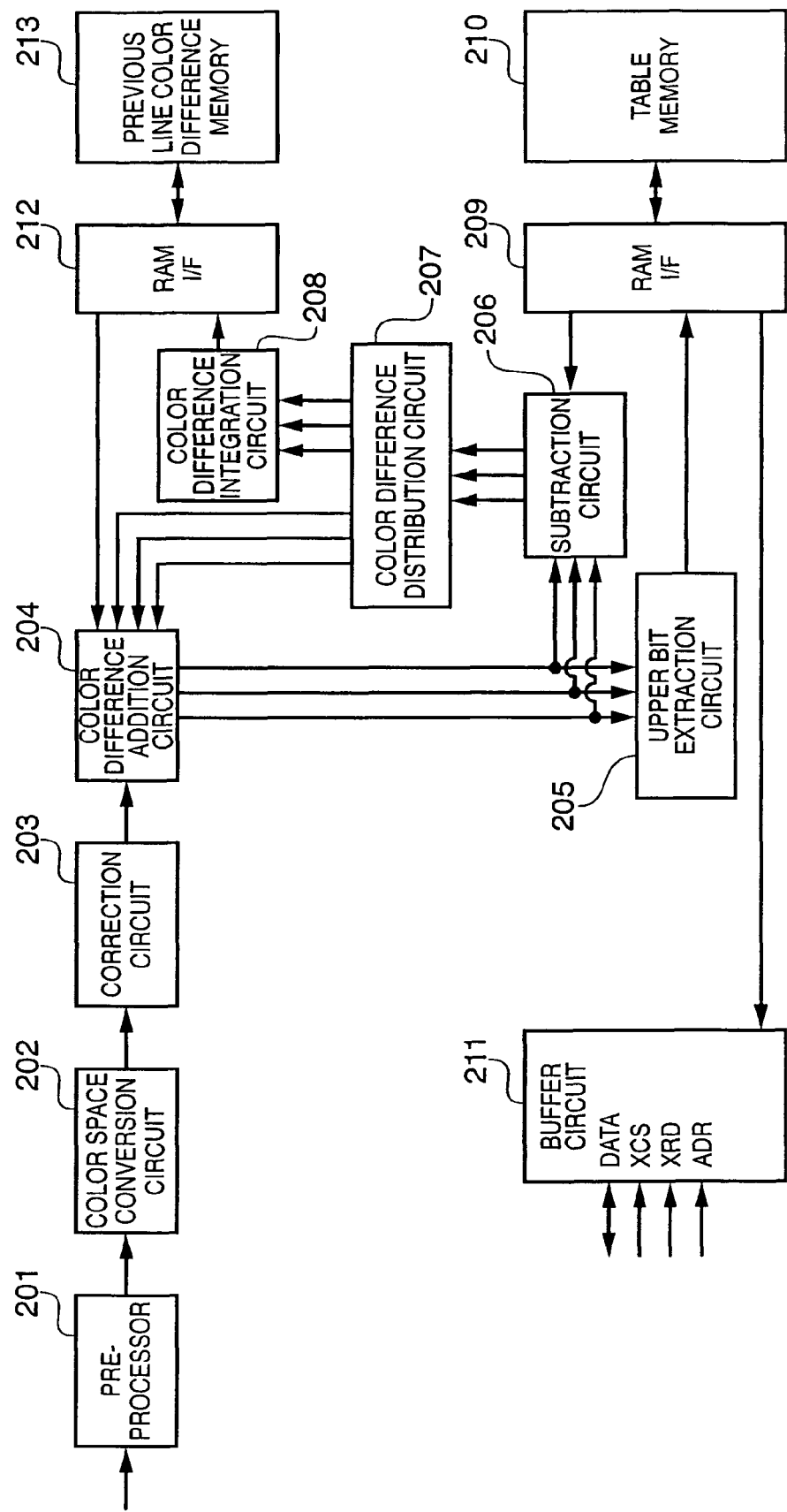
FIG. 6 is a block diagram showing the detailed arrangement of a quantization processor shown in FIG. 1.

FIG. 6 is a block diagram showing the detailed arrangement of the quantization processor 3. A quantization process that converts color component data into ternary data will be exemplified below. However, the present invention is not limited to ternary conversion, and the same applies to binary conversion, quaternary conversion, and the like.

As will be described later, the quantization processor 3 executes a process for associating 8-bit input luminance data R, G, and B with quantized data Y, M, C, and K used in the print section 4.

The quantization processor 3 shown in FIG. 6 roughly comprises a pre-processing block, a CD method block that implements color difference diffusion of an output pattern, and a block of various memories and their interfaces.

R, G, and B 8-bit luminance data that have undergone color conversion by the color converter 2 undergo processes such as edge emphasis, noise removal, resolution conversion, and the like as needed by a pre-processor 201, and are then input to a color space conversion circuit 202.

The R, G, and B data are converted from the RGB color space into a CMY color space in the color space conversion circuit 202, and C, M, and Y data then undergo gamma conversion and the like required to convert into an image that reflects the characteristics of the print section 4 in a correction circuit 203. Note that the color space conversion, gamma conversion, and the like normally use conversion tables. It is advantageous to combine these conversion tables into one table in terms of implementation.

The C, M, and Y data output from the correction circuit 203 are added with color difference data of a previous line and those of a previous pixel (to be described later) in a color difference addition circuit 204.

Then, a combination pattern (output pattern) of inks which reproduce a color closest to the C, M, and Y data added with the color difference data on the color space is selected. This selection is made based on the CD method. It is preferable to calculate the distances between C, M, and Y data and output patterns and store them in a table (output color table) in advance, since the processing load can be reduced. Note that the distance calculations may be made on other color spaces (L*a*b*, YCbCr, and the like).

Furthermore, in this embodiment, an upper bit extraction circuit 205 extracts the upper 3 bits (total of 9 bits) of each of the C, M, and Y data (total of 24 bits) added with the color difference data, and input them to an output color table so as to further reduce the processing load.

That is, the 9-bit data (total) output from the upper bit extraction circuit 205 are input to a table memory 210 that stores an output color table via a RAM I/F 209, and C, M, Y, and K 1-bit data (output pattern) as print data corresponding to the 9-bit data (total) are output to a buffer circuit 211 via the RAM I/F 209.

When input data is converted into a smaller number of bits, errors (color differences) are generated inevitably, and color reproduction impairs due to the errors. Hence, the color differences are diffused to surrounding pixels using the CD method to avoid deterioration of color reproduction. Details of color difference diffusion will be described below.

Diffusion of Color Difference

A subtraction circuit 206 shown in FIG. 6 calculates the color differences between the density information of input data and that of the selected output pattern. As the density information of the output pattern, information obtained by predicting the density upon printing that pattern under a predetermined condition or information experimentally obtained by measurement is used. The predicted or measured density information is stored in the table memory 210 as an output density table corresponding to the output color table, and density information corresponding to the selected output pattern is supplied to the subtraction circuit 206 via the RAM I/F 209.

A color difference distribution circuit 207 distributes the calculates color differences to respective pixels. That is, after the color differences are weighted, they are supplied to the color difference addition circuit 204 to be added to the next pixel, and are also supplied to a color difference integration circuit 208 to be diffused to pixels in the next line. The color difference integration circuit 208 calculates the sum of the color differences for each pixel corresponding to that in the next line, and stores the sum in a previous line color difference memory 213 via a RAM I/F 212.

Figure 7:
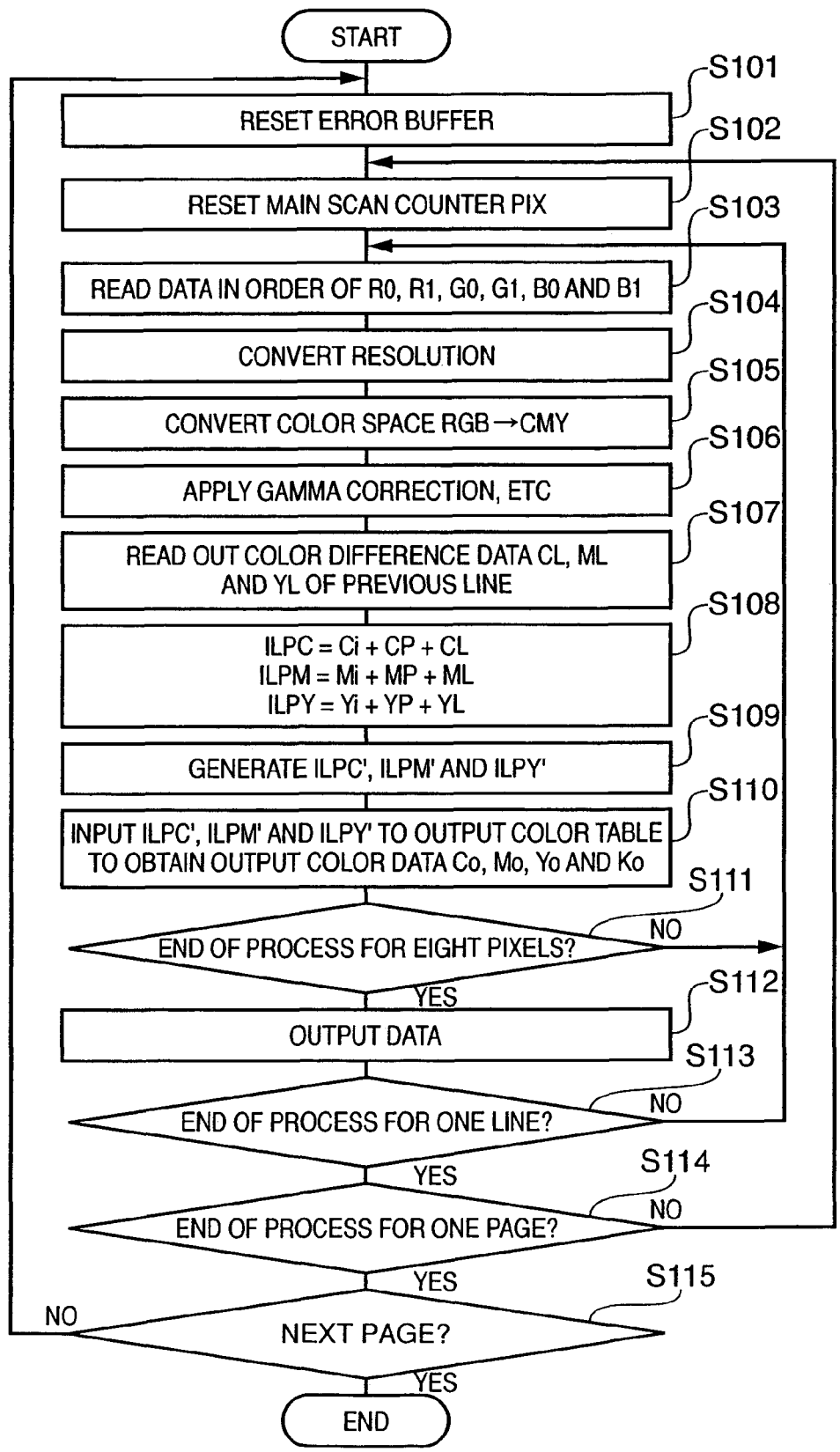
FIG. 7 is a flow chart showing a process to be executed by the quantization processor.
Figure 8:
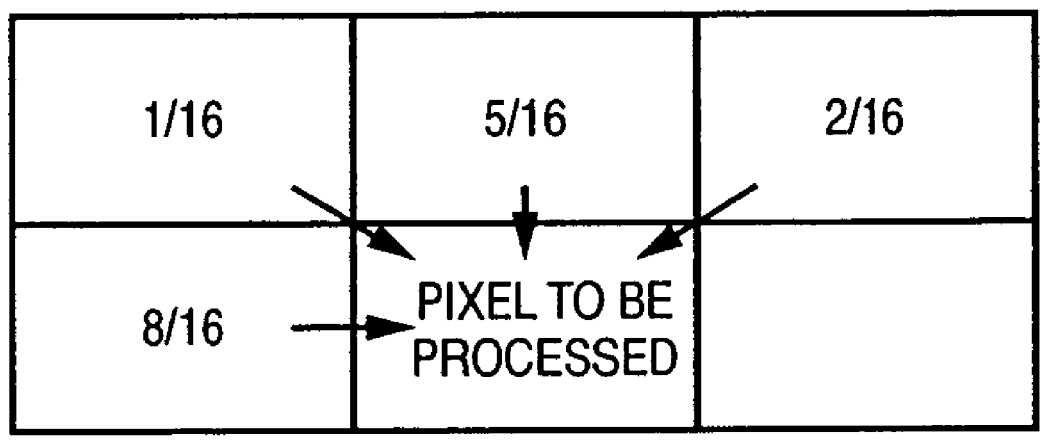
FIG. 8 shows an example of color difference diffusion coefficients.

FIG. 7 is a flow chart showing the process to be executed by the quantization processor 3.

Upon execution of a color copy or print process, the previous line color difference memory 213 and respective buffers in the color converter 2 are cleared (S101). A counter PIX which indicates the pixel to be processed is reset to zero (S102). After a document image is read (or after image data is input), image data that have undergone various pre-processes are written in registers, which are assigned to R, G, and B data respectively, of the quantization processor 3 (S103). In case of this embodiment which converts the resolution from 300 dpi to 600 dpi, the number of accesses can be reduced and the resolution conversion efficiency can be improved when data for two pixels (R0, R1, G0, G1, B0, and B1) are input at the same time.

As a method of managing the process of the quantization processor 3, a method of counting clocks is available. A system counter starts to count clocks in response to data written by the CPU 11 as a trigger. When the processing timing is controlled on the basis of the count value of the system counter, an optimal processing circuit can be designed. Also, since processes (circuits) synchronized with clocks can be realized, timing verification and the like can be easily done.

For example, when data are written in the order of addresses R, G, and B in the process in step S103, the system counter starts to count clocks in response to data written at address B as a trigger. The system counter is cleared by software or in response to next data written at address R.

Interpolated pixels Rc0 and Rc1 are generated from pixels R0 and R1 (S104). Upon converting the resolution from 300 dpi into 600 dpi, Rc0 is generated by bit-shifting the previous pixel and R0 and adding them. G and B pixels are similarly interpolated.

The color space conversion circuit 202 converts the resolution-converted R, G, and B data into C, M, and Y data (S105). Note that RGB CMY conversion can be independently executed for each color. If the processing performance has a margin against the processing load, R, G, and B data may be converted into data on another color space.

In order to convert into an image that reflects the characteristics of the print section 4, the correction circuit 203 applies gamma conversion and the like to the C, M, and Y data (S106).

With the above processes, data Ci, Mi, and Yi are generated.

Figure 5:
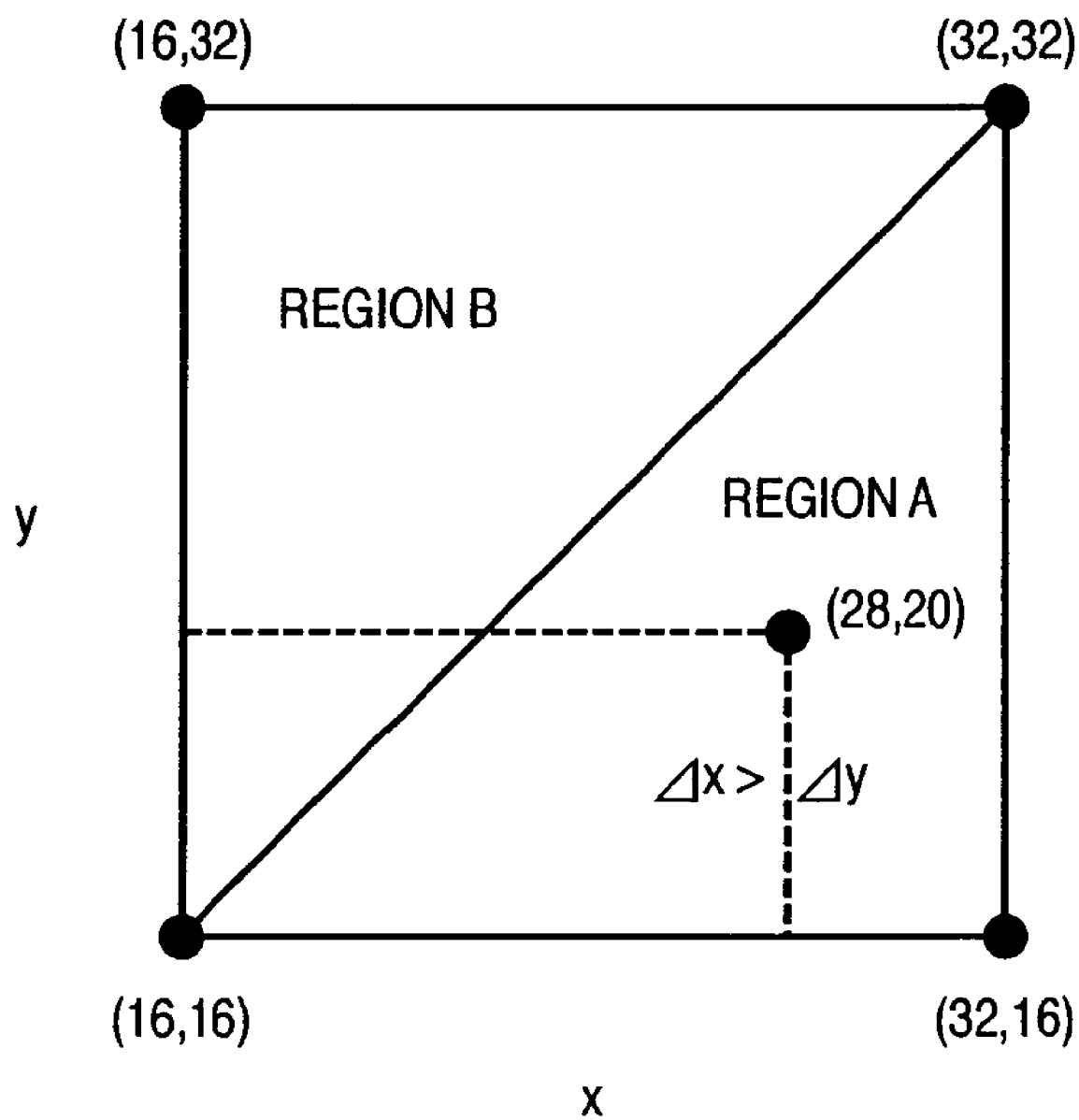
FIG. 5 is a view for explaining the concept of an interpolation unit shown in FIG. 3.

Subsequently, color difference data CL of the previous line to be diffused to the pixel to be processed is read out from the previous line color difference memory 213 (S107). This color difference data CL will be described later. Subsequently, as shown in FIG. 5, the color difference addition circuit 204 adds the color difference data CL of the previous line and color difference data CP of a previous pixel (a pixel processed by the immediately preceding process) to the data Ci of the pixel to be processed (S108), and stores the sum Ci+CL+CP in a buffer of the color difference addition circuit 204 as data ILPC. This buffer can store signed 11-bit data (−512 to +512). When ILPC exceeds 512, it is rounded to 512 to prevent the buffer from overflowing. Hence, the circuit scale of the color difference addition circuit 204 can be reduced within the range that does not influence an image.

Similar processes are parallelly executed for the data Mi and Yi to store data ILPM and ILPY in the buffer. In this manner, data obtained by adding the color differences of the predetermined pixel in the previous line and previously processed pixel to data of the pixel to be processed can be obtained.

Address data ILPC', ILPM', and ILPY' are generated by extracting the upper 3 bits of each of the calculated data ILPC, ILPM, and ILPY (S109), and are input to an output color table shown in FIG. 9 to obtain an output pattern (Co, Mo, Yo, and Ko) closest to the color of input data on the color space. The obtained output pattern is stored in a register. Note that the output color table has the following configuration.

On the color space, distance L between colors defined by input data ILPC, ILPM, and ILPY, and colors Cp, Mp, and Yp indicated by color measurement data actually obtained by the print section 4 is calculated by:

$$L2 = (ILPC - Cp)^2 + (ILPM - Mp)^2 + (ILPY - Yp)^2 \quad (1)$$

The values Yp, Mp, and Cp are changed within a range shown in the output color table of FIG. 9 to find a combination of Cp, Mp, and Yp, which yields a minimum value L2. Then, an output color table which stores ternary data Ko, Co, Mo, and Yo corresponding to combinations of Cp, Mp, and Yp in correspondence with input data ILPC, ILPM, and ILPY is generated.

When the above calculation is made to obtain output color data of each pixel, the load on software and hardware becomes considerably heavy, and a long processing time is required. To avoid this problem, in this embodiment, the above calculation results are pre-stored in a table, thus quickly obtaining an output pattern (Ko, Co, Mo, and Yo) closest to the color of input data on the color space on the basis of the input data ILPC, ILPM, and ILPY that take the color differences into consideration.

Furthermore, when a plurality of output tables for the CD method corresponding to the characteristics and print method of a printer, the characteristics of print agents such as inks, toners, or the like, and the characteristics of print media are prepared on the table memory 210, an optimal output pattern (Ko, Co, Mo, and Yo) can be obtained quickly by using the CD method. Also, the console 15, an external personal computer, or the like can input the print method, the characteristics of print agents and the characteristic of print media, and can change or designate the output color table to be used can be changed or designated, thus an image can be expressed using a plurality of dots or dots having different sizes. Note that the output color table inputs higher-order 3 bits each of ILPC, ILPM and ILPY as an input address, thus a memory size of the output color table is reduced and the table memory 210 can store a plurality of the output color table.

The input data ILPC, ILPM, and ILPY are respectively signed 11-bit data, as described above, but each of data Ko, Co, Mo, and Yo of the output pattern is several bits (2 bits in this embodiment). In this embodiment, the size of the output color table is reduced by obtaining output color data using the upper several bits of input data. That is, the output color table can be formed of 512 sets of table data using address data ILPC', ILPM', and ILPY' of the upper 3 bits (a total of 9 bits) of each of the input data ILPC, ILPM, and ILPY by removing their sign.

Next, the output pattern (Ko, Co, Mo, and Yo) is stored in the buffer circuit 211. This output pattern indicates a combination of output dots. Registers are respectively assigned to C, M, Y, and K data, and the processes in steps S103 to S110 are repeated until data for eight pixels corresponding to the data bus size are stored (S111). After the substitution result data for eight pixels are stored in the buffer circuit 211, these data are read out (S112).

By reading out the substitution result data every eight pixels, the number of accesses from the CPU 11 is reduced. Furthermore, when the print section 4 processes data for each line, the load on a data rearrangement process by software can be reduced. When data for two pixels are output in the sub-scan direction, the output bits are separately written in independent registered, so that these data can be output to the print section 4 as data for different lines. If the CPU 11 has a transfer mode for each word (16 bits), two each registers may be assigned to each of C, M, Y, and K data, and the data may be read out after data for 16 pixels are stored.

Upon completion of quantization of data for one line (S113), the line to be processed is incremented, and the flow returns to step S102. Upon completion of quantization for one page (S114), if the next page to be processed remains (S115), the flow returns to step S101; otherwise, the process ends.

Diffusion of Color Difference

Figure 10:
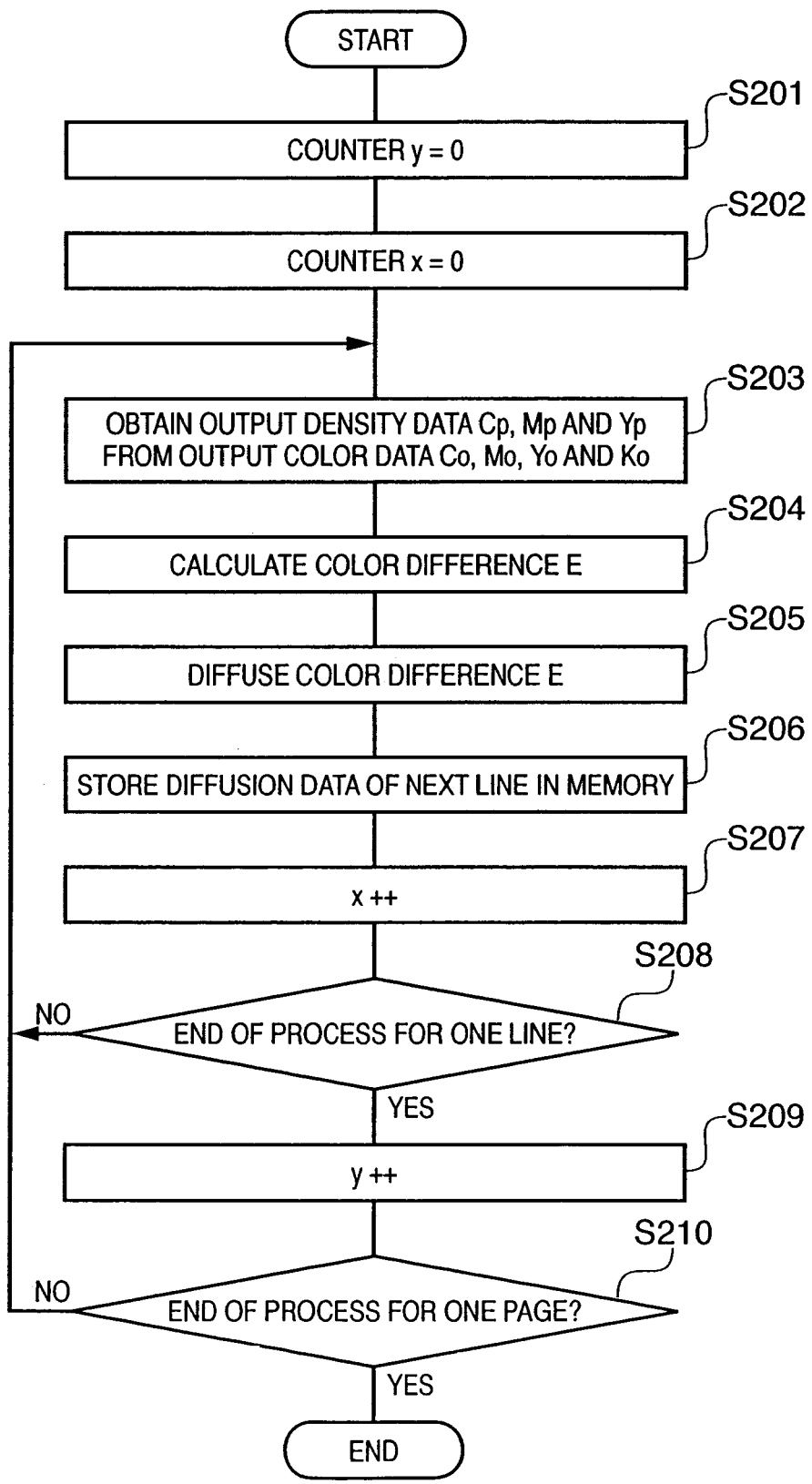
FIG. 10 is a flow chart showing a process for diffusing color differences generated in a quantization process.

FIG. 10 is a flow chart showing an example of the process for diffusing color differences produced in the quantization process.

A counter y indicating the vertical position of the pixel to be processed is reset to zero (S201), and a counter x indicating the horizontal position of the pixel to be processed is reset to zero (S202).

An output density table shown in FIG. 11 is looked up on the basis of the output pattern (Co, Mo, Yo, and Ko) obtained from the output color table, thus obtaining multi-valued data Cp, Mp, and Yp (S203). Note that the data Cp, Mp, and Yp indicate the densities of a color printed on the basis of Co, Mo, Yo, and Ko, as described above.

The subtraction circuit 206 calculates color differences Ce, Me, and Ye between the input data Ci, Mi, and Yi, and output density data Cp, Mp, and Yp (S204).

$$Ce = Cp - Ci$$
$$Me = Mp - Mi \quad (2)$$
$$Ye = Yp - Yi$$

The color difference distribution circuit 207 diffuses the color differences Ce, Me, and Ye to neighboring pixels. More specifically, as exemplified in FIG. 12, the color differences are diffused to four pixels, i.e., a right pixel of the pixel to be processed, and a lower left pixel, lower pixel, and lower right pixel in the next line. Diffusion to the right pixel is achieved by sending diffusion data to the color difference addition circuit 204 (S205), and diffusion to the three pixels in the next line is achieved by sending diffusion data to the previous line color difference memory 213 (S206). Also, the diffusion ratio is as follows:

2/16·E to lower left pixel (x−1, y+1)

5/16·E to lower pixel (x, y+1)

1/16·E to lower right pixel (x+1, y+1)

8/16·E to right pixel (x+1, y)

where E is the color difference of a pixel (x, y) to be processed.

By further distributing the remainder obtained by dividing the color difference by 16 to the right pixel (x+1, y), the color difference information can be reflected without any losses.

Therefore, the color difference addition circuit 204 makes addition (S205) described by:

$$Yi(x+1, y) = Yi(x+1, y) + Ye/2$$

$$Mi(x+1, y) = Mi(x+1, y) + Me/2 \quad (3)$$

$$Ci(x+1, y) = Ci(x+1, y) + Ce/2$$

Thus, color difference E(x, y) to be diffused to the pixel (x, y) to be processed is given by:

$$E(x, y) = 1/16 \cdot E(x-1, y-1) + 5/16 \cdot E(x, y-1) + \quad (4)$$
$$2/16 \cdot E(x+1, y-1) + 8/16 \cdot E(x-1, y)$$

In the above equation, diffusion data for the previous line (y−1) is stored in the previous line color difference memory 213. That is, as described above, the color difference integration circuit 208 stores, for a set of pixels of the previous lines, the sum of color differences given by:

$$CL = 1/16 \cdot E(x-1, y-1) + 5/16 \cdot E(x, y-1) + \quad (5)$$
$$2/16 \cdot E(x+1, y-1)$$

In this way, the memory can be effectively used.

Figure 12:
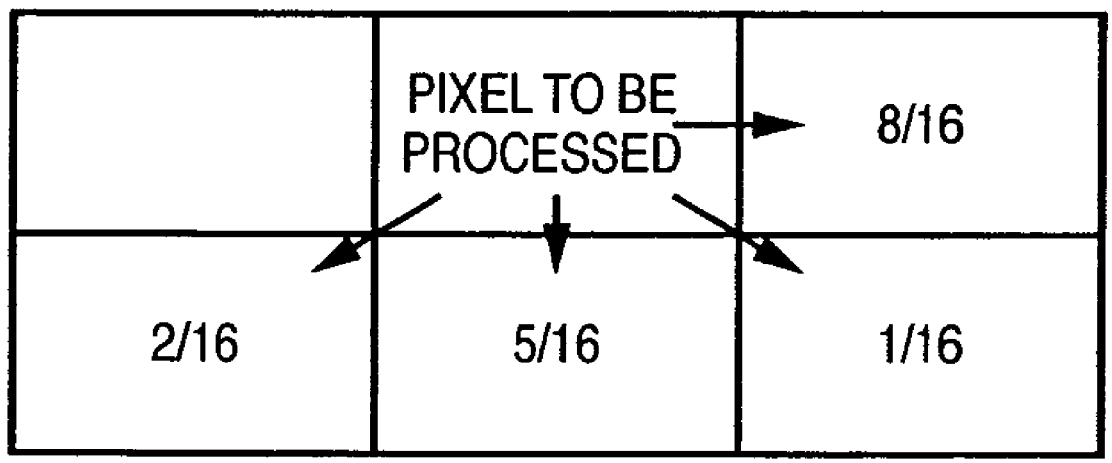
FIG. 12 shows an example of color difference diffusion coefficients.

In order to reduce the number of accesses by utilizing a memory chip, the diffusion coefficients shown in FIG. 12 can be determined so that the color difference to be stored falls within 8 bits (−128 to +128). By broadening a region to which the color difference is diffused, more faithful color reproduction can be obtained. Since the color difference is diffused to unprocessed pixels, if the processing direction is alternately switched between the right and left directions, the color difference can be prevented from being diffused in only a specific direction, thus suppressing deterioration of image quality such as moiré and the like.

The counter x is incremented (S207), and it is checked if the process for one line is complete (S208). Upon completion of the process for one, the counter y is incremented (S209), and it is checked if the process for one page is complete (S210). If the process for one page is not complete yet, the flow returns to step S203.

Determination of Output Color Table

Combinations of output colors used by the system are determined first. There are eight combinations of output colors when output data for two pixels in the sub-scan direction are generated in response to one pixel input, even when both the pixels are formed of a combination of identical color dots.

Figure 14:
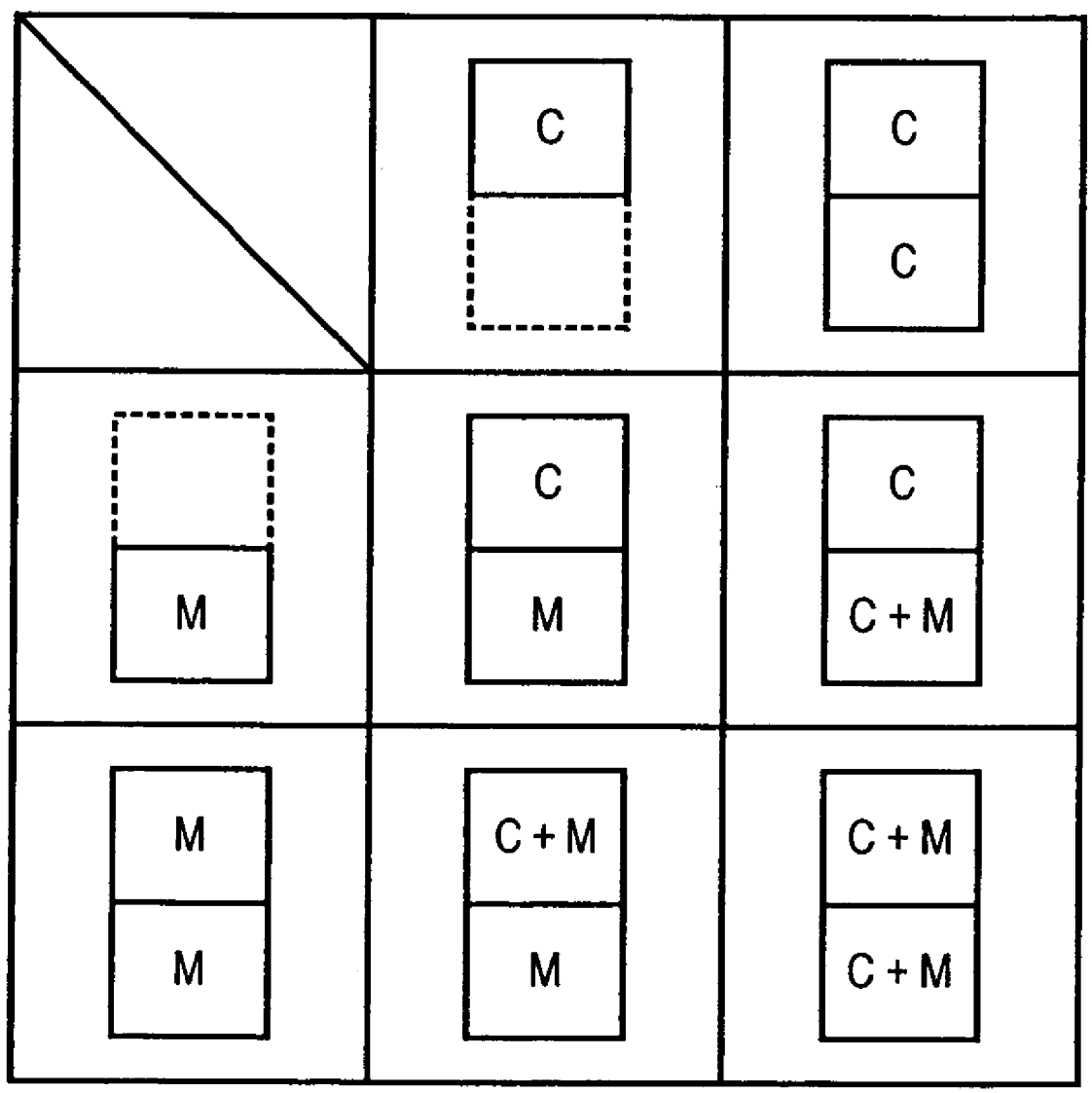

A case wherein two dots have different colors will be explained with reference to FIGS. 13 and 14.

If Y and K dots are not used, when C=0 and M=0, neither of dots are printed to form white (print medium color). When C=1 and M=0, only a C dot is printed; when C=2 and M=0, two C dots are printed; and when C=2 and M=2, two C dots and two M dots are printed. In this way, color spaces corresponding in number to combinations of Y and C, M and Y, and respective colors and K can be expressed (see FIG. 14).

Arithmetically, $3^4=81$ different combinations are available. However, colors such as (C, M, Y, K)=(1, 1, 1, 2) and the like, which can be satisfactorily reproduced by other combinations, and combinations which cannot be used due to limitations such as ink dot size limitations and the like are excluded. The remaining combinations of output patterns are printed as color patches on an actual print medium, and the printed color patches are measured. That is, the color spaces of data obtained by reading the color patches by the scanning unit 14 are converted by the color space conversion circuit 202. The obtained colorimetric data are stored in a table shown in FIG. 15 as data Cp, Mp, and Yp obtained from the patches.

Using equation (1) above, distance L between ILP, and Cp, Mp, and Yp is calculated, and the table shown in FIG. 11 is generated from Cp, Mp, and Yp that can minimize distance L, i.e., C, M, Y, and K data used to generate the color patches.

As described above, the CD method of this embodiment substitutes all input colors by combinations of output colors (combinations of color dots) closest to the input colors, and diffuses color differences generated at that time to surrounding pixels. Therefore, the way input colors correspond to combinations of output colors becomes a basis upon improving the color reproducibility using the CD method.

As described above, since C, M, Y, and K data must be obtained for ILPC, ILPM, and ILPY data, and Yp, Mp, and Cp data must be obtained for C, M, Y, and K data, a table shown in FIG. 16 obtained by combining the tables shown in FIGS. 9 to 11 is stored in the table memory 210.

Note that the correspondences between ILPC, ILPM, and ILPY, and C, M, Y, and K, and those between C, M, Y, and K, and Yp, Mp, and Cp vary depending on inks or print media to be used even when the print section 4 remains the same. Therefore, when the table shown in FIG. 16 is switched in correspondence with inks, print media, and the like supported by the print section 4, high color reproducibility can be obtained. In this case, a table may be read out from the ROM or the like for each copy or each setup change without storing a plurality of tables in a RAM such as the table memory 210 or the like, and may be stored in the table memory 210. Conversely, an average table common to inks, print media, and the like supported by the print section 4 may be stored in the table memory 210, thus simplifying the table.

[Generation of Table]

The design method of the table of the quantization processor 3 and 3D-LUT 31 will be briefly described below.

The characteristics of the quantization processor 3 are specified by print media (paper types and the like) and print materials (characteristics of inks and the like). Therefore, the table of the quantization processor 3 is designed to be able to diffuse color differences on a space expressed by primary colors of respective inks in place of a simple density space, so as to express maximum and sufficient gray levels. That is, the table is defined to maximize the spaces of colors that can be expressed with respect to values input to the quantization processor 3.

On the other hand, the 3D-LUT 31 defines which RGB input values correspond to which colors of output data. For example, when a plurality of tables such as a table that increases the saturation of a specific hue, a table that increases the contrast of a middle luminance, and the like are prepared as the 3D-LUT, images having various features (color appearances) can be obtained.

As described above, according to this embodiment, preferred color conversion that matches respective hue, saturation, and lightness levels can be made with high precision, and color separation which is optimal to an output device and respective print modes of that device, and also to print media can be processed at high speed.

Furthermore, color separation that flexibly cope with user's needs (e.g., "quick", "fine") and/or print media to be used, and preferred color conversion can be independently made. Processes corresponding to huge combinations of the characteristics of input/output devices, user's color favors, modes of user's choice, types of media, and the like can be efficiently done, and preferred color reproduction can be achieved.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

The present invention is not limited to the above-described embodiments, and various changes and modifications can be made within the spirit and scope of the present invention. Therefore, in order to apprise the public of the scope of the present invention, the following claims are made.

What is claimed is:

1. An image processing apparatus, comprising:
   a converter, arranged to color-convert input image data using a three-dimensional table selected from a plurality of three-dimensional tables and an interpolation process;
   a first calculator, arranged to obtain error-corrected data by adding error data to the color-converted image data;
   an output section, arranged to select a dot pattern from a combination of dot patterns selected from a plurality of combinations of dot patterns based on the error-corrected data, and output the selected dot pattern as an output dot pattern;
   an obtaining section, arranged to obtain data, which indicates an output color corresponding to the output dot pattern, by referring to an output density table; and
   a second calculator, arranged to obtain the error data by calculating a difference between the data which indicates the output color, and the color-converted image data,
   wherein the plurality of three-dimensional tables include three-dimensional tables in correspondence with the output color.

2. The apparatus according to claim 1, wherein each dot pattern expresses a combination of color dots.

3. The apparatus according to claim 1, wherein said output section selects the combination of dot patterns in correspondence with a print medium on which the output color is printed.

4. The apparatus according to claim 1, wherein the plurality of three-dimensional tables include a three-dimensional table having a conversion characteristic that increases contrast of a middle luminance.

5. The apparatus according to claim 1, wherein the plurality of three-dimensional tables include a three-dimensional table having a conversion characteristic that increases a saturation of a specific hue.

6. An image processing method comprising the steps of:
   color-converting input image data using a three-dimensional table selected from a plurality of three-dimensional tables and an interpolation process;
   obtaining error-corrected data by adding error data to the color-converted image data;
   selecting a dot pattern from a combination of dot patterns selected from a plurality of combinations of dot patterns based on the error-corrected data, and outputting the selected dot pattern as an output dot pattern;
   obtaining data, which indicates an output color corresponding to the output dot pattern, by referring to an output density table; and
   obtaining the error data by calculating a difference between the data which indicates the output color, and the color-converted image data,
   wherein the plurality of three-dimensional tables include three-dimensional tables in correspondence with the output color.

7. The method according to claim 6, wherein each dot pattern expresses a combination of color dots.

8. The method according to claim 6, wherein the combination of dot patterns is selected in correspondence with a print medium on which the output color is printed.

9. The method according to claim 6, wherein the plurality of three-dimensional tables include a three-dimensional table having a conversion characteristic that increases contrast of a middle luminance.

10. The method according to claim 6, wherein the plurality of three-dimensional tables include a three-dimensional table having a conversion characteristic that increases a saturation of a specific hue.

11. A computer readable medium storing a computer-executable program comprising program code for causing a computer to perform an image processing method, the method comprising the steps of:
    color-converting input image data using a three-dimensional table selected from a plurality of three-dimensional tables and an interpolation process;
    obtaining error-corrected data by adding error data to the color-converted image data;
    selecting a dot pattern from a combination of dot patterns selected from a plurality of combinations of dot patterns based on the error-corrected data, and outputting the selected dot pattern as an output dot pattern;

obtaining data, which indicates an output color corresponding to the output dot pattern, by referring to an output density table; and obtaining the error data by calculating a difference between the data which indicates the output color, and the color-converted image data, wherein the plurality of three-dimensional tables include three-dimensional tables in correspondence with the output color.

* * * * *